(12) United States Patent
Xu

(10) Patent No.: US 11,392,638 B2
(45) Date of Patent: *Jul. 19, 2022

(54) METHODS AND DEVICES FOR STORING AND MANAGING AUDIO DATA ON BLOCKCHAIN

(71) Applicant: Alipay (Hangzhou) Information Technology Co., Ltd., Zhejiang (CN)

(72) Inventor: Hui Xu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,455

(22) Filed: Aug. 11, 2021

(65) Prior Publication Data

US 2021/0374177 A1 Dec. 2, 2021

Related U.S. Application Data

(63) Continuation of application No. 16/952,728, filed on Nov. 19, 2020, now Pat. No. 11,120,075, which is a (Continued)

(51) Int. Cl.
*G06F 16/61* (2019.01)
*G06F 16/64* (2019.01)
(Continued)

(52) U.S. Cl.
CPC .......... *G06F 16/61* (2019.01); *G06F 16/635* (2019.01); *G06F 16/64* (2019.01); *H04L 9/0643* (2013.01); *H04L 2209/38* (2013.01)

(58) Field of Classification Search
CPC ........ G06F 16/61; G06F 16/64; G06F 16/635; H04L 9/0643; H04L 2209/38
See application file for complete search history.

(56) References Cited

U.S. PATENT DOCUMENTS

2016/0335347 A1* 11/2016 Yi ........................... G10L 25/54
2018/0189020 A1* 7/2018 Oskarsson .............. H04L 65/60
(Continued)

FOREIGN PATENT DOCUMENTS

| CN | 107452408 A | | 12/2017 | |
|----|----|----|----|----|
| CN | 110276172 A | * | 9/2019 | ............. G06F 21/10 |

(Continued)

OTHER PUBLICATIONS

International Search Report in Application No. PCT/CN2019/121949, from the National Intellectual Property Administration, PRC, dated Aug. 27, 2020.

(Continued)

*Primary Examiner* — Fan S Tsang
*Assistant Examiner* — David Siegel
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for storing and managing audio data. One of the methods includes: receiving a request to store audio data; associating the audio data with a spectrogram generated based on the audio data; storing the audio data and the spectrogram on a blockchain; and providing access to the audio data based on the spectrogram.

13 Claims, 6 Drawing Sheets

Related U.S. Application Data continuation of application No. PCT/CN2019/121949, filed on Nov. 29, 2019.

(51) Int. Cl.
   *G06F 16/635* (2019.01)
   *H04L 9/06* (2006.01)

(56) References Cited

U.S. PATENT DOCUMENTS

2019/0347290 A1* 11/2019 Yang .................... G10H 1/0058
2020/0260147 A1*  8/2020 Madisetti ............. H04N 21/233

FOREIGN PATENT DOCUMENTS

| CN | 110276172 A | * | 9/2019 |
| CN | 110276172 A | | 9/2019 |
| WO | WO 2016/109500 A1 | | 7/2016 |
| WO | WO 2019/184518 A1 | | 10/2019 |

OTHER PUBLICATIONS

Written Opinion of the International Search Authority in the International Application No. PCT/CN2019/121949, dated Aug. 27, 2020.
European Search Report in European Application No. 19885789.8, dated Mar. 18, 2021.
Lee, K-S, et al., "Use of blockchain for music content copyright protection", Myongji University, Jun. 19, 2019, 5 pages.
Examination Report for Australian Patent Application No. 2019379953, dated Jun. 15, 2021, 3 pages.
Examination Report of European Application No. 19 885 789.8, dated Dec. 16, 2021.
Examination Report No. 2 for Standard Patent Application of Australian Application No. 2019379953, dated Sep. 24, 2021.
Examination Report for Canadian Application No. 3,098,349, dated Oct. 29, 2021.

* cited by examiner

US 11,392,638 B2

METHODS AND DEVICES FOR STORING AND MANAGING AUDIO DATA ON BLOCKCHAIN

CROSS REFERENCE TO RELATED APPLICATIONS

This application is a continuation of U.S. application Ser. No. 16/952,728, filed Nov. 19, 2020, which is a continuation of International Application No. PCT/CN2019/121949, filed Nov. 29, 2019, the entire contents of both of which are incorporated herein by reference.

TECHNICAL FIELD

The specification relates generally to computer technologies, and more particularly, to methods and devices for storing and managing audio data on a blockchain.

BACKGROUND

Sound may be recorded in, or converted into, audio signals, including, e.g., digital audio signals. Digital audio signals may be stored on digital data storage devices, including, e.g., compact discs, audio players, hard chives, flash drives, network storage devices, and the like.

A spectrogram is a visual representation of a spectrum of frequencies of a signal. When applied to audio signals, spectrograms are sometimes called sonographs, voiceprints, or voicegrams.

Spectrograms may be presented as graphs. Some spectrograms may include an axis representing time and another axis representing frequency. Some spectrograms may include a third dimension indicating the amplitude of a particular frequency at a particular time. The third dimension may be represented by intensity, brightness, or color. The third dimension may also be represented by height on a three-dimensional (3D) surface.

SUMMARY

In one aspect, a computer-implemented method for storing and managing audio data includes: receiving a request to store audio data; associating the audio data with a spectrogram generated based on the audio data; storing the audio data and the spectrogram on a blockchain; and providing access to the audio data based on the spectrogram.

In another aspect, a device for storing and managing audio data includes: one or more processors; and one or more computer-readable memories coupled to the one or more processors and having instructions stored thereon that are executable by the one or more processors to: receive a request to store audio data; associate the audio data with a spectrogram generated based on the audio data; store the audio data and the spectrogram on a blockchain; and provide access to the audio data based on the spectrogram.

In still another aspect, a non-transitory computer-readable medium has stored therein instructions that, when executed by a processor of a device, cause the device to perform a method for storing and managing audio data. The method includes: receiving a request to store audio data; associating audio data with a spectrogram generated based on the audio data; storing the audio data and the spectrogram on a blockchain; and providing access to the audio data based on the spectrogram.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
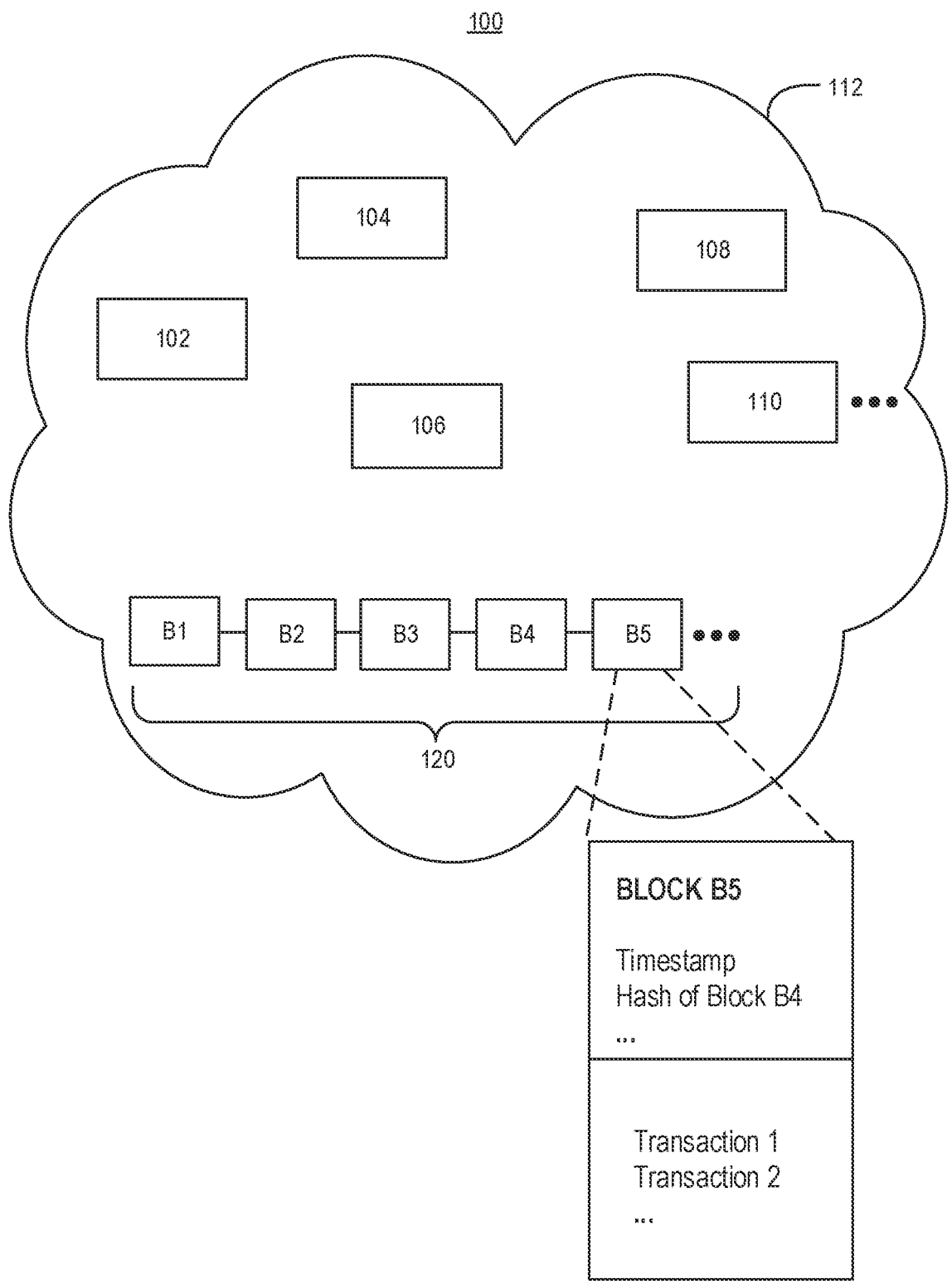
FIG. 1 is a schematic diagram of a blockchain system, according to an embodiment.

Embodiments of the specification provide methods and devices for storing and managing audio data. The methods and devices utilize blockchain systems to store audio data, enabling users to store audio data securely and immutably. The methods and devices also support generation of spectrograms for the stored audio data, and support retrieval of the audio data using the spectrograms generated. In this manner, the methods and devices may allow the spectrograms to be used for various purposes, including, e.g., for commemorating purposes and the like.

Embodiments disclosed in the specification have one or more technical effects. In some embodiments, the methods and devices store audio data on a blockchain. This provides users with a blockchain system that is capable of securely and immutably storing audio data. In some embodiments, the methods and devices support generation of spectrograms for the stored audio data. This provides a mechanism for users to retrieve the stored audio data using the spectrograms generated for the audio data. In some embodiments, the methods and devices further support production of two-dimensional (2D) or three-dimensional (3D) objects incorporating the spectrograms. Furthermore, in some embodiments, the methods and devices may support image recognition of the objects produced. This allows the objects produced to be used for various purposes, including, e.g., for commemorating purposes, where a user may use an object produced with a spectrogram incorporated therein to retrieve a corresponding audio data for playback.

Blockchain systems, also known as distributed ledger systems (DLSs) or consensus systems, may enable participating parties to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A block-chain system is implemented using a peer-to-peer (P2P) network, in which the nodes communicate directly with each other, e.g., without the need of a fixed, central server. Each node in the P2P network may initiate communication with another node in the P2P network. A blockchain system maintains one or more blockchains.

A blockchain is a data structure that stores data, e.g., transactions, in a way that may prevent tampering and manipulation of the data by malicious parties. The transactions stored in this manner may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public block-chain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
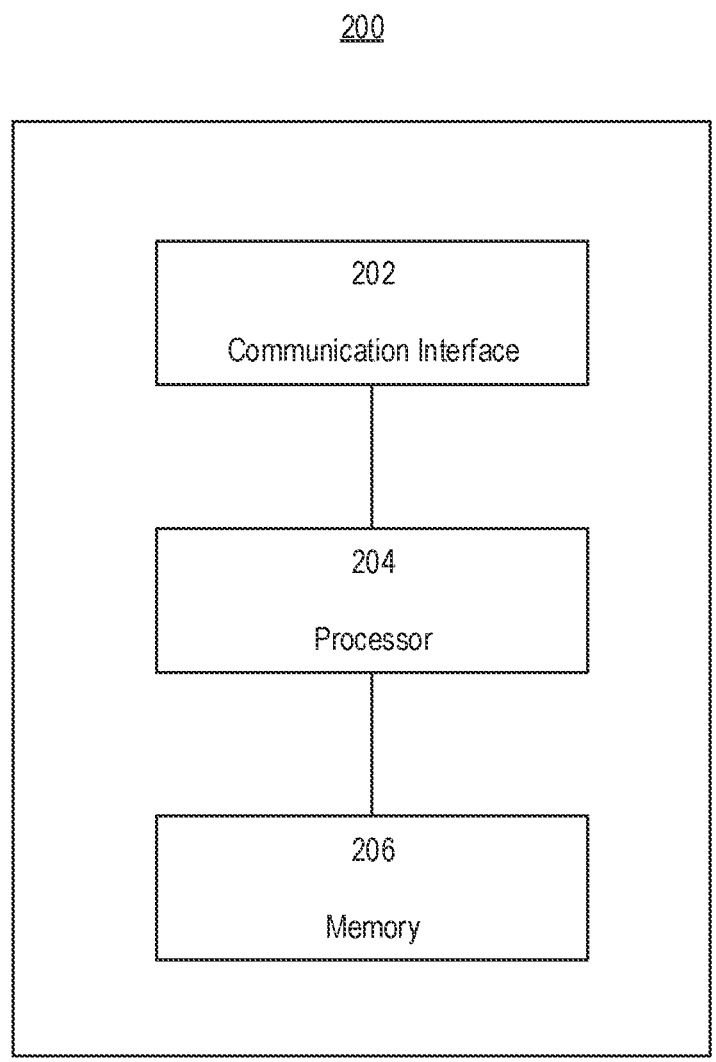
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Figure 3:
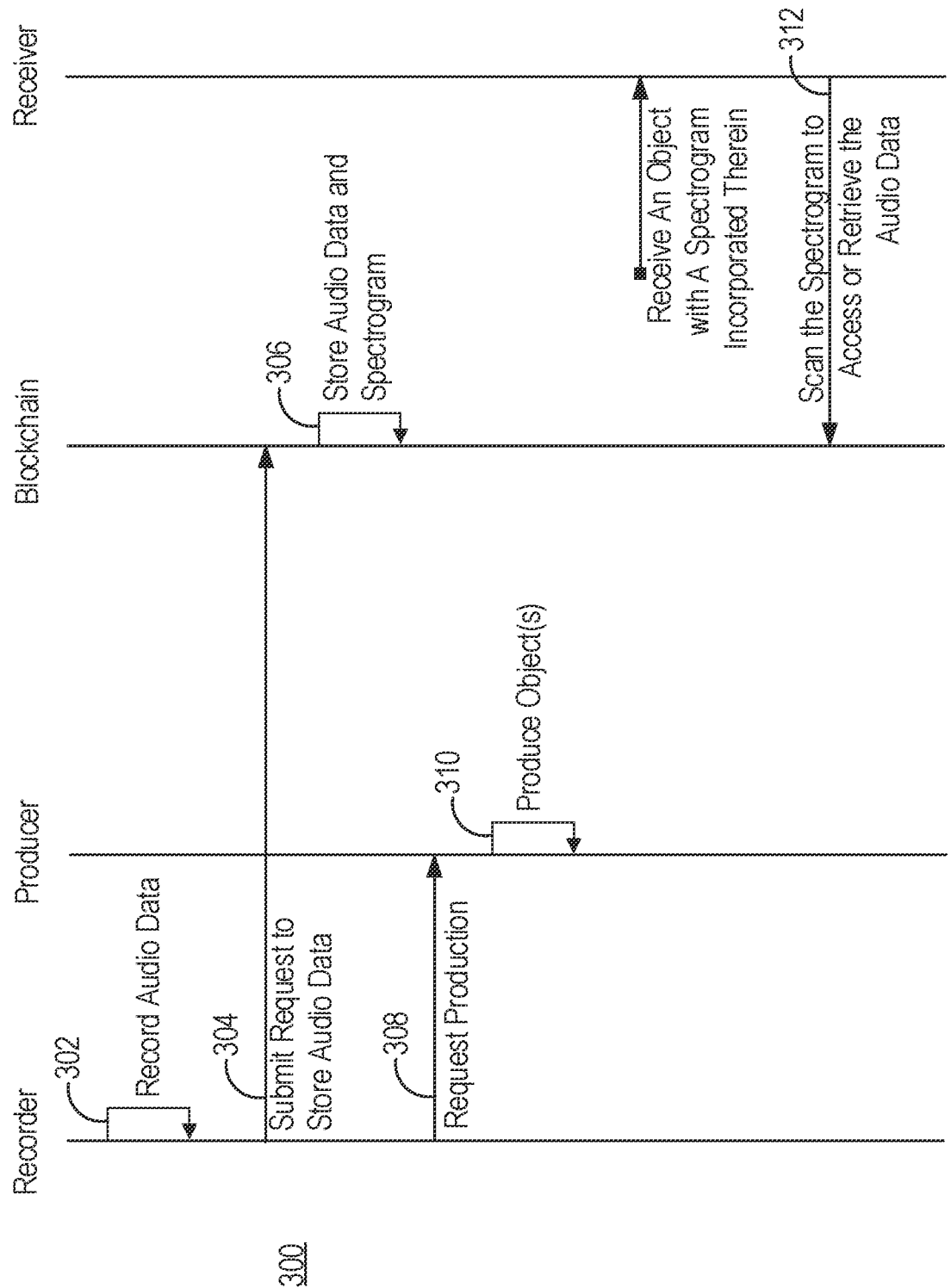
FIG. 3 is a flow chart of a method for storing and managing audio data on a blockchain, according to an embodiment.

FIG. 3 illustrates a flow chart of a method 300 for storing and managing audio data on a blockchain according to an embodiment. Referring to FIG. 3, multiple users may have accounts on a Blockchain, e.g., the blockchain 120 (FIG. 1). The Blockchain may be implemented to support various types of users, or parties, including, e.g., individuals, businesses, produce producers, manufacturers, as well as other types of companies, organizations, and the like.

For illustrative purposes, multiple users are depicted in FIG. 3, which includes a Recorder, a Producer, and a Receiver. The Recorder may represent a user capable of recording audio data. The Producer may represent a user capable of producing a 2D or 3D object based on a spectrogram generated for the audio data. The object may be received by the Receiver, who may use the object to retrieve the audio data for playback.

At step 302, the Recorder may record audio data. The Recorder may record the audio data using various types of recording devices, including, e.g., mobile phones, sound recorders, video recorders, and the like. The Recorder may record various types of sound, including, e.g., the Recorder's own voice, someone else's voice, voice of a group, and the like.

At step 304, the Recorder may submit a request to store the audio data to the Blockchain. In some embodiments, the Recorder may submit the request through the recording device (e.g., the Recorder's mobile phone). In some embodiments, the recording device may generate a spectrogram based on the recorded audio data at step 302, and submit the spectrogram to the Blockchain along with the audio data at step 304. In some embodiments, the Blockchain may utilize one or more programs executing on the Blockchain to generate the spectrogram based on the audio data received from the Recorder. Such programs may be implemented in the form of computer code that are incorporated into the Blockchain. For example, users of the Blockchain may generate a program using a programming language, such as C++, Java, Solidity, Python, etc., and when the audio data is received, the program may be automatically executed on the Blockchain, e.g., to generate the spectrogram based on the audio data submitted by the Recorder. In some embodiments, the Blockchain may provide the Recorder with a copy of the generated spectrogram.

In some embodiments, the Blockchain may impose a size limit on data that can be submitted to the Blockchain per request. In such embodiments, the recording device may submit the audio data to the Blockchain in a single request if the size of the audio data is within the size limit imposed by the Blockchain. Otherwise, the recording device may split the audio data into multiple segments and submit the multiple segments to the Blockchain in multiple requests. In some embodiments, the recording device may compress the audio data using one or more data compression techniques. In some embodiments, the recording device may store the content of the audio data in a separate storage device, e.g., a cloud-based storage device, and submit a reference to the stored content as the audio data to the Blockchain. The reference to the stored content may include, e.g., a link, an address, or a pointer to the stored content.

At step 306, the audio data and the spectrogram may be stored on the Blockchain. In some embodiments, the Blockchain may associate the audio data and the spectrogram as a pair. That is, the Blockchain may recognize the audio data as being associated with the spectrogram and recognize the spectrogram as being associated with the audio data. In some embodiments, the Blockchain may store the spectrogram and the audio data as a key-value pair, allowing the audio data to be retrieved using the spectrogram as the key. It is to be understood that other types of data structures may be utilized to store the spectrogram and the audio data on the Blockchain.

At step 308, the Recorder may request the Producer to produce one or more 2D or 3D objects with the spectrogram incorporated therein. In some embodiments, the Recorder may provide the spectrogram to the Producer via an off-chain communication channel. In some embodiments, the Recorder may provide the Producer with information regarding how to obtain the spectrogram (e.g., the address of the spectrogram), and the Producer may obtain the spectrogram from the Blockchain based on the information provided by the Recorder.

Figure 4:
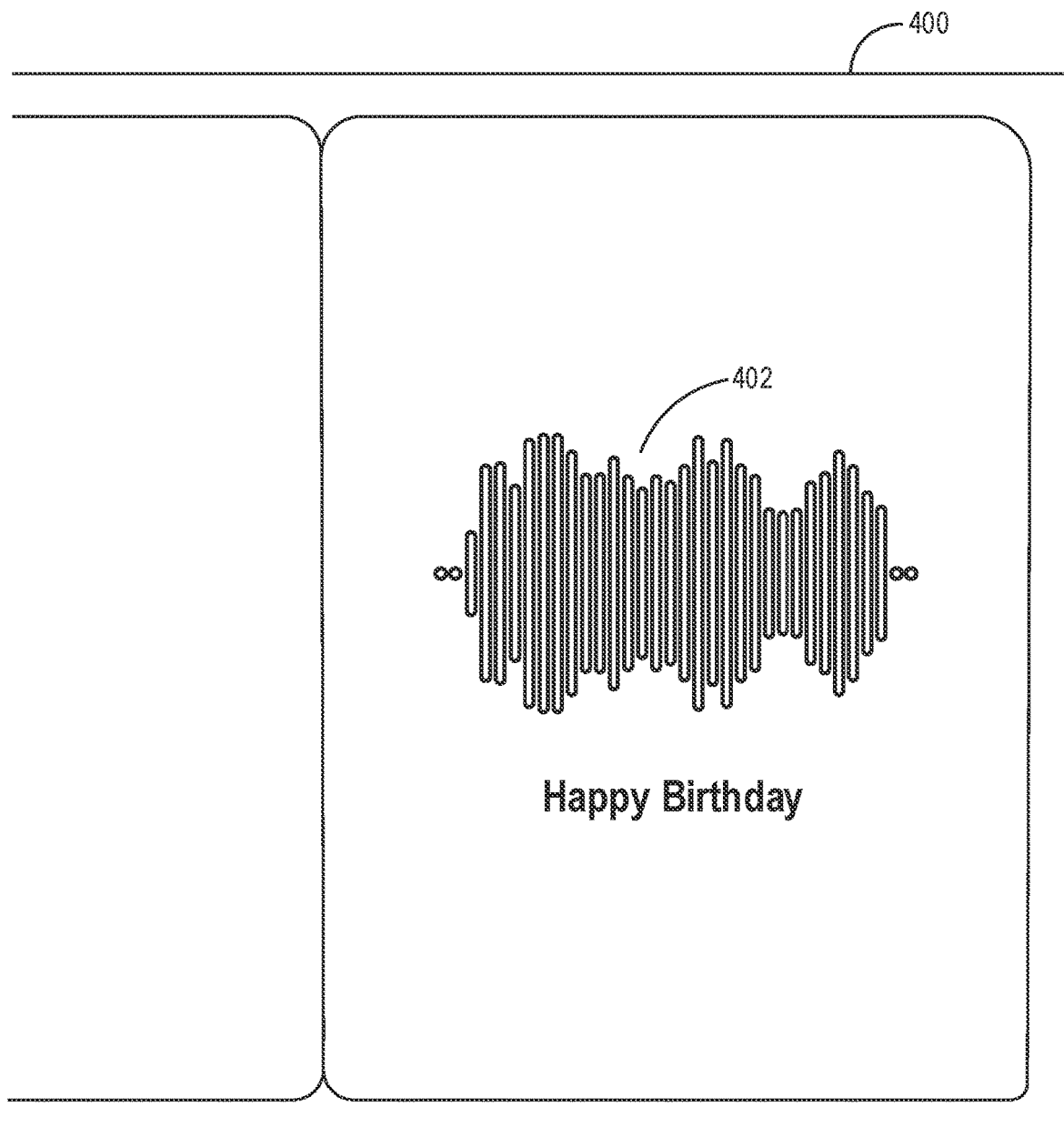
FIG. 4 is an illustration of an object printed with a spectrogram, according to an embodiment.

The Recorder may request the Producer to produce the objects for various reasons. For example, the Recorder may record a voice message wishing a friend happy birthday. The Recorder may then submit the audio data representing the voice message to the Blockchain, which may generate a spectrogram based on the audio data and provide the spectrogram to the Producer so that the Producer may produce, at step 310, a birthday card printed with the spectrogram. FIG. 4 is an illustration of a card 400 printed with such a spectrogram 402. After the card 400 is printed, the Producer may deliver the card 400 to the Recorder, who may present the card 400 to the Receiver. Alternatively, the Producer may deliver the card 400 directly to the Receiver if such a delivery is requested by the Recorder.

Figure 5:
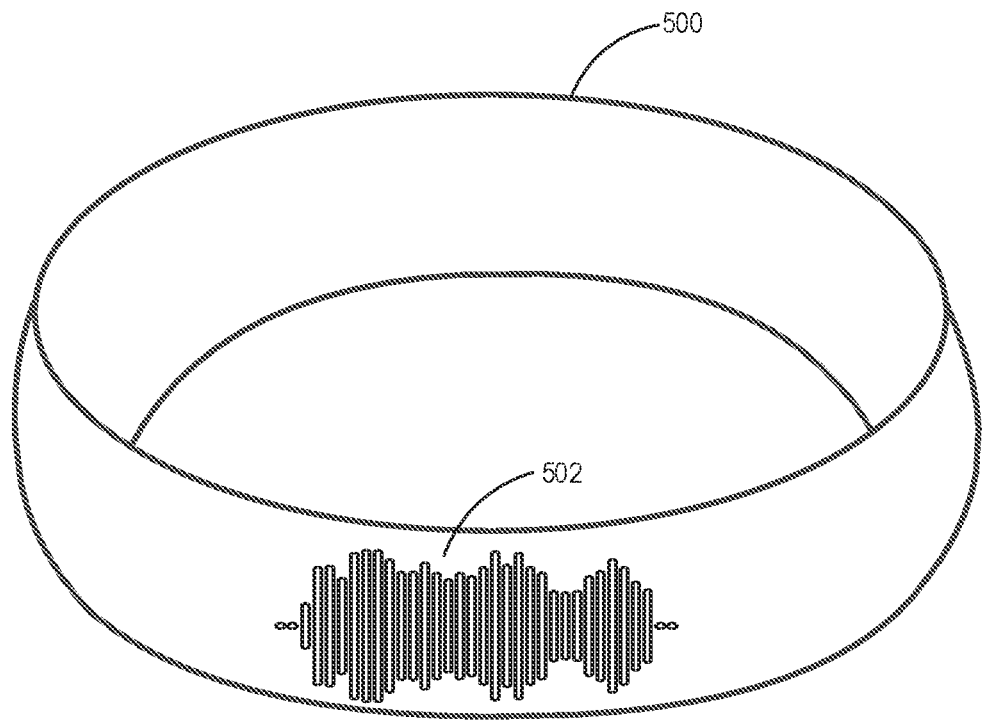
FIG. 5 is an illustration of an object formed with a pattern representing a spectrogram, according to an embodiment.

It is to be understood that the Recorder may request the Producer to produce other types of objects as well. For example, FIG. 5 depicts a ring 500, which may be formed with a pattern representing a spectrogram 502. It is to be understood that the Producer may also produce tattoo patterns, sculptures, drawings, paintings, memorabilia, souvenirs, electronic messages, as well as other types of objects with the spectrogram incorporated therein. It is also to be understood that the spectrograms shown in FIGS. 4 and 5 are depicted merely for illustrative purposes. It is contemplated that other types of depictions, including, e.g., heat maps and the like, may also be utilized to depict the spectrograms.

The Receiver may use the spectrogram incorporated in the object (e.g., the spectrogram 402 printed on the card 400) to access or retrieve the voice message recorded by the Recorder. Referring back to FIG. 3, for example, at step 312, the Receiver may scan the spectrogram using various types of scanning devices. Such scanning devices may include, e.g., mobile phones, cameras, spectrogram readers, and the like. In some embodiments, the scanning device may capture an image of the spectrogram and utilize one or more image recognition techniques to process the spectrogram, which may then be utilized as a key to access or retrieve the corresponding audio data from the Blockchain. In some embodiments, the scanning device may compare the recognized image against the spectrograms stored on the Blockchain to identify a spectrogram that most closely matches the recognized image, and utilize the identified spectrogram as a key to access or retrieve the corresponding audio data from the Blockchain. In some embodiments, the scanning device may provide data representing the captured image to the Blockchain and request the Blockchain to identify a spectrogram that most closely matches the captured image. If a match is found, the Blockchain may allow the scanning device to access or retrieve the corresponding audio data from the Blockchain. Otherwise, if no match is found (e.g., if similarities between the captured image and the spectrograms stored on the Blockchain are below a certain threshold), the Blockchain may refuse to provide the scanning device access to the audio data stored on the Blockchain.

In some embodiments, if the Blockchain allows the Receiver (e.g., using the scanning device) to access or retrieve the corresponding audio data from the Blockchain, then the Receiver may utilize an audio player to play the audio data, which in turn may allow the Receiver to hear the voice message recorded by the Recorder. In some embodiments, the scanning device and the audio player may be the same device, e.g., the Receiver's mobile phone. In some embodiments, the Blockchain may allow the Receiver to download the audio data. In some embodiments, the Blockchain may allow the Receiver to stream the audio data. In some embodiments, the Blockchain may provide audio streaming services to the Receiver without providing the Receiver the ability to download the audio data.

In some embodiments, the Receiver may be required to pay a fee to access or retrieve audio data from the Blockchain. In some embodiments, the fee may be a one-time access fee. In some embodiments, the fee may be required each time the Receiver attempts to access or retrieve the audio data from the Blockchain. In some embodiments, the fee may be an annual-subscription fee. It is to be understood that the fee may vary depending on the payment structure implemented. In some embodiments, certain types of receivers may be allowed to access or retrieve certain types of audio data from the Blockchain free of charge.

In some embodiments, the Producer may produce the objects to include additional information that can be used to identify the audio data or the spectrogram stored on the Blockchain. Such information may include, e.g., address information concerning where the audio data and the spectrogram are stored. In some embodiments, the additional information may be contained in a machine-readable code, including, e.g., a two-dimensional (2D) barcode. In such embodiments, the Receiver may utilize the scanning device to process the address information contained in the machine-readable code and identify the audio data or the spectrogram without having to perform image recognition of the spectrogram. The Receiver may then use the additional information contained in the machine-readable code to access or retrieve the voice message recorded by the Recorder. It is to be understood that whether to include such additional information may be determined by the Recorder, or the Producer, or both.

Figure 6:
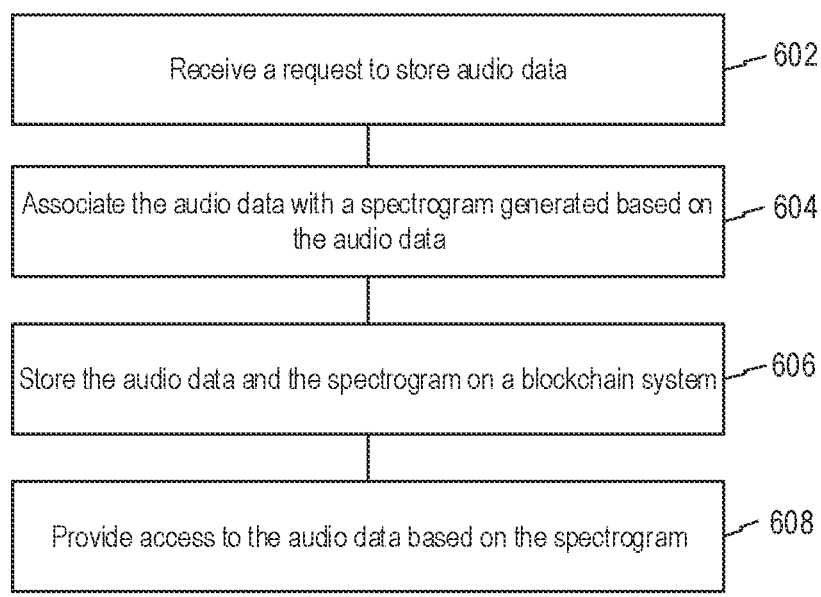
FIG. 6 is a flow chart of a method for storing and managing audio data on a blockchain, according to an embodiment.

FIG. 6 illustrates a flow chart of a method 600 for storing and managing audio data on a blockchain, e.g., the blockchain 120 (FIG. 1), according to an embodiment. The method 600 may be performed by one or more nodes in a blockchain system that maintains the blockchain, e.g., the nodes 102-110 in the blockchain system 100 (FIG. 1).

At step 602, a node, e.g., the node 102, may receive a request to store audio data. In some embodiments, the request may also include a spectrogram generated based on the audio data. In some embodiments, the node 102 may generate the spectrogram based on the audio data received.

At step 604, the node 102 may associate the audio data with the spectrogram. In some embodiments, the node 102 may associate the audio data with the spectrogram as a pair. That is, the node 102 may recognize the audio data as being associated with the spectrogram and recognize the spectrogram as being associated with the audio data.

At step 606, the node 102 may store the audio data and the spectrogram on the blockchain 120. In some embodiments, the node 102 may store the spectrogram and the audio data on the blockchain 120 as a key-value pair, allowing the audio data to be retrieved using the spectrogram as the key. It is to be understood that other types of data structures may be utilized to store the spectrogram and the audio data on the blockchain 120.

At step 608, the node 102 may provide access to the audio data by providing audio playback of the audio data based on the spectrogram. In some embodiments, the node 102 may provide access to the audio data by allowing a user of the blockchain 120 to access the audio data using the spectrogram as a key. In some embodiments, the node 102 may receive data representing an image captured by a user of the blockchain 120, compare the image with spectrograms stored on the blockchain 120, and if a matching spectrogram is found (e.g., if the similarity between the image and the matching spectrogram is above a certain threshold), the node 102 may provide the user with access to the audio data associated with that matching spectrogram. In some embodiments, the node 102 may provide access to the audio data by providing the user with audio playback of the audio data. On the other hand, if no match is found (e.g., if similarities between the image and the spectrograms stored on the blockchain 120 are below a certain threshold), the blockchain 120 may refuse to provide the user with access to the audio data stored on the blockchain 120.

It is to be understood that the image captured by the user may include a picture of at least a portion of an object. The object may have a spectrogram incorporated therein and may be in the form of a card, a ring, or other types of objects referenced above.

Figure 7:
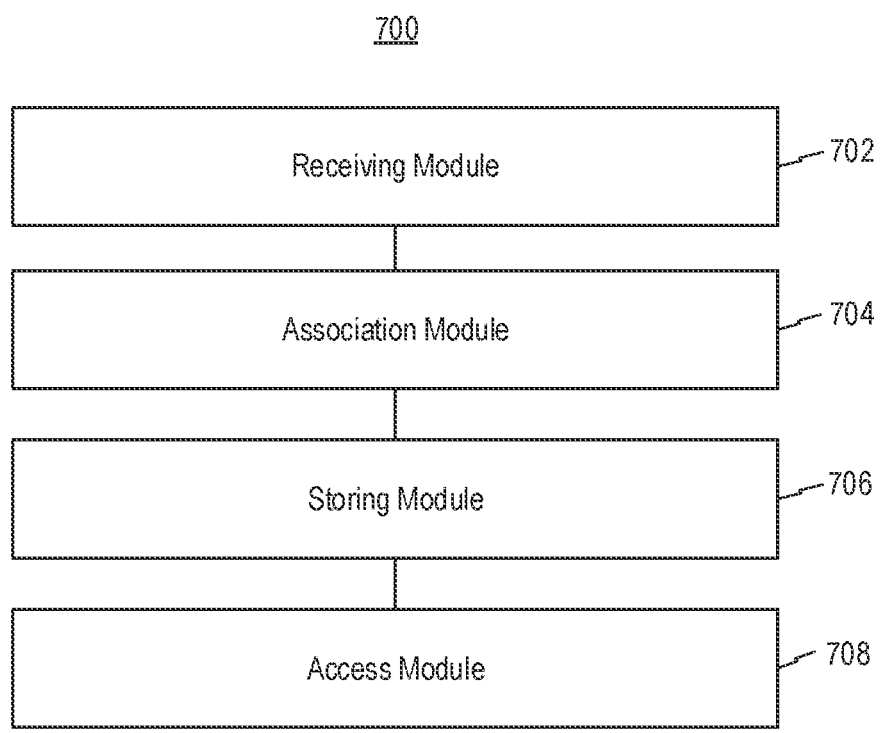
FIG. 7 is a block diagram of an apparatus for storing and managing audio data on a blockchain, according to an embodiment.

FIG. 7 is a block diagram of an apparatus 700 for storing and managing audio data, according to an embodiment. For example, the apparatus 700 may be an implementation of a software process, and may correspond to the method 600 (FIG. 6). Referring to FIG. 7, the apparatus 700 may include a receiving module 702, an association module 704, a storing module 706, and an access module 708.

The receiving module 702 may receive a request to store audio data. In some embodiments, the request may also include a spectrogram generated based on the audio data. In some embodiments, the receiving module 702 may generate the spectrogram based on the audio data received. The receiving module 702 may provide the audio data and the spectrogram to the association module 704.

The association module 704 may associate the audio data with the spectrogram. In some embodiments, the association module 704 may associate the audio data with the spectrogram as a pair. That is, the association module 704 may recognize the audio data as being associated with the spectrogram and recognize the spectrogram as being associated with the audio data. The association module 704 may provide the audio data and the spectrogram as a pair to the storing module 706.

The storing module 706 may store the audio data and the spectrogram. In some embodiments, the storing module 706 may store the audio data and the spectrogram on a blockchain. In some embodiments, the storing module 706 may store the spectrogram and the audio data on the blockchain as a key-value pair, allowing the audio data to be retrieved using the spectrogram as the key. It is to be understood that the storing module 706 may utilize other types of data structures to store the spectrogram and the audio data.

The access module 708 may provide access to the audio data based on the spectrogram. In some embodiments, the access module 708 may provide access to the audio data by allowing a user of the blockchain to access the audio data using the spectrogram as a key. In some embodiments, the access module 708 may receive data representing an image captured by a user of the blockchain, compare the image with spectrograms stored on the blockchain, and if a matching spectrogram is found, the access module 708 may provide the user with access to the audio data associated with that matching spectrogram. In some embodiments, the access module 708 may provide access to the audio data by providing the user with audio playback of the audio data. On the other hand, if no match is found, the access module 708 may refuse to provide the user with access to the audio data stored on the blockchain.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 700 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 700, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A computer-implemented method for storing and managing audio data, the method comprising:
receiving a request to store audio data;
associating the audio data with a spectrogram generated based on the audio data;
storing the audio data and the spectrogram on a blockchain; and
providing access to the audio data based on the spectrogram,
wherein the providing access to the audio data comprises:
receiving data obtained from a machine-readable code to identify the spectrogram, wherein the machine-readable code comprises a two-dimensional barcode contained in an object produced with the spectrogram incorporated therein; and
providing audio playback of the audio data associated with the spectrogram.

2. The method of claim 1, further comprising:
generating the spectrogram upon receiving the request to store the audio data.

3. The method of claim 1, further comprising:
receiving the spectrogram with the audio data.

4. The method of claim 1, wherein the providing access to the audio data further comprises:
receiving data representing an image;
determining whether the image matches the spectrogram;
in response to a determination that the image matches the spectrogram, identifying the audio data associated with the spectrogram; and
providing audio playback of the audio data identified as being associated with the spectrogram.

5. The method of claim 4, wherein the image represents at least a portion of the object produced with the spectrogram incorporated therein.

6. The method of claim 1, wherein the providing access to the audio data further comprises:
providing audio streaming of the audio data.

7. A device for storing and managing audio data, comprising:
one or more processors; and
one or more computer-readable memories coupled to the one or more processors and having instructions stored thereon that are executable by the one or more processors,
wherein the one or more processors are configured to:
receive a request to store audio data;
associate the audio data with a spectrogram generated based on the audio data;
store the audio data and the spectrogram on a blockchain; and
provide access to the audio data based on the spectrogram,
wherein in providing access to the audio data, the one or more processors are further configured to:
receive data obtained from a machine-readable code to identify the spectrogram, wherein the machine-readable code comprises a two-dimensional barcode contained in an object produced with the spectrogram incorporated therein; and
provide audio playback of the audio data associated with the spectrogram.

8. The device of claim 7, wherein the one or more processors are further configured to:
generate the spectrogram upon receiving the request to store the audio data.

9. The device of claim 7, wherein the one or more processors are further configured to:
receive the spectrogram with the audio data.

10. The device of claim 7, wherein in providing access to the audio data, the one or more processors are further configured to:
receive data representing an image;
determine whether the image matches the spectrogram;
in response to a determination that the image matches the spectrogram, identify the audio data associated with the spectrogram; and
provide audio playback of the audio data identified as being associated with the spectrogram.

11. The device of claim 10, wherein the image represents at least a portion of the object produced with the spectrogram incorporated therein.

12. The device of claim 7, wherein in providing access to the audio data, the one or more processors are further configured to:
provide audio streaming of the audio data.

13. A non-transitory computer-readable medium having stored therein instructions that, when executed by a processor of a device, cause the device to perform a method for storing and managing audio data, the method comprising:
receiving a request to store audio data;
associating the audio data with a spectrogram generated based on the audio data;
storing the audio data and the spectrogram on a blockchain; and
providing access to the audio data based on the spectrogram,
wherein the providing access to the audio data comprises:
receiving data obtained from a machine-readable code to identify the spectrogram, wherein the machine-readable code comprises a two-dimensional barcode contained in an object produced with the spectrogram incorporated therein; and
providing audio playback of the audio data associated with the spectrogram.

* * * * *

UNITED STATES PATENT AND TRADEMARK OFFICE
CERTIFICATE OF CORRECTION

PATENT NO. : 11,392,638 B2  
APPLICATION NO. : 17/399455  
DATED : July 19, 2022  
INVENTOR(S) : Hui Xu Page 1 of 1

It is certified that error appears in the above-identified patent and that said Letters Patent is hereby corrected as shown below:

On the Title Page

Item (71), in the Applicant, Line 2, "Zhejiang (CN)" should read --Hangzhou (CN)--.

Item (72), in the Inventor, Line 1, "Zhejiang (CN)" should read --Hangzhou (CN)--.

Signed and Sealed this  
Sixth Day of September, 2022

Katherine Kelly Vidal  
*Director of the United States Patent and Trademark Office*